UNITED STATES PATENT OFFICE 2,157,507

PROCESS FOR PRODUCING MATERIALS FOR REMOVAL OF CERTAIN HALIDE IONS FROM WATER

Oliver M. Urbain and William R. Stemen, Columbus, Ohio, assignors to Charles H. Lewis, Harpster, Ohio No Drawing. Application November 27, 1935, Serial No. 51,966. Renewed October 25, 1938

4 Claims. (Cl. 23—85)

This invention relates to the provision of a process for producing materials for use in the removal of all halide ions, with the exception of chloride ions from water.

It is the purpose of the invention to provide a process that will be easily carried out and one that will be economical to practice.

Coming now to a specific description of the invention and the manner of practicing the process we wish to point out that the materials prepared in accordance with the invention for the purpose of effecting the exchange of halide ions are made up of the metal chloride silicates. They conform to the general formulae:

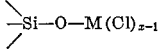

in which M designates a metal with a valence of two or more, and $x$ designates a number equal to the valence of M.

The materials for effecting the exchange must have a solubility in water of less than 0.3 gram per liter. The general formulae show only the active part of the molecule, the three free valences to the left of the Si indicating the manner of attachment of the inactive part of the molecule.

In this case we have used two types of formulae. We have for the purpose of illustration used the

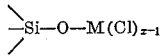

formula to show the active grouping in our compounds and it should be noted that the three free valences of the Si have not been satisfied. We use the formula of the type

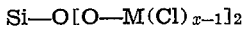

to show how the active grouping given above fits into a specific complete compound in which all free valences are satisfied, the latter compound being such a compound. This compound is a type of metasilicate. The only difference in these structures lies in the satisfaction of the free valences.

In the preparation of these materials the general reaction for their preparation may be expressed, as follows:

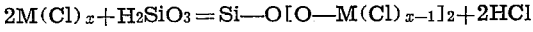

Specific examples of reactions occurring in the preparation of exchange materials in accordance with our invention, are as follows:

*Example No. 1*

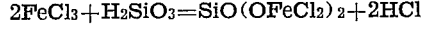

*Example No. 2*

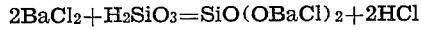

In the first example we employ anhydrous ferric chloride and silicic acid, and in the second example we employ barium chloride and silicic acid. The exchange materials can be prepared in either of two ways:

First, by fusing the appropriate metal chloride with silicic acid under definitely controlled conditions, and, Second, by treating a solution of sodium silicate with the appropriate metal chloride in solution. If the latter procedure is followed it is necessary to subsequently oxidize the metal of the material to a state of higher valence and, thereby, introduce one or more chlorine atoms into the molecule. When the exchange materials are used for the removal of halide ions from water the chlorine in these compounds is replaced by the anion removed, e. g.,

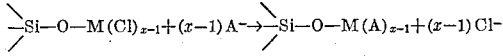

where, $A^-$ = negative halide ion other than Cl.

In the employment of these materials there undoubtedly occurs some superficial adsorption of the halide ions but, in the main, we find that the halogens are removed from the water by an exchange mechanism whereby the halide ions, with, of course, the exception of the chloride ions, are exchanged for chloride ions which are loosely held by the material through chemical or physical processes, or both. This procedure is somewhat analogous to cation exchange as effected through the medium of zeolites except in our process we effect the exchange of anions instead of cations.

In the preparation of these halide ion exchange mediums we have, in general, made these materials by fusing a mixture of a metal halide with silicic acid or its anhydride.

The metal of the metal halide must have a valence of two or more. In some cases the presence of a further monovalent metal in the above reaction mixture is desirable. When such a monovalent metal halide is employed its halide must be the same as the halide of the metal having a valence of two or more. Mixed halides cannot be used. We have also discovered that, in some cases, we get a more efficient product by heating the reaction product obtained, as outlined above, in an atmosphere of a halogen.

For purposes of illustration we now describe the preparation of two materials suitable for halide exchange. We do not wish to be limited to these specific preparations as they are merely illustrative.

1. Five (5) parts of silicic acid and twenty-five (25) parts of hydrated barium chloride are intimately mixed and ground together. The mixture is fused at a temperature between 500° C. and 1500° C. for a period of from one to four hours.

After cooling, the mass is washed free of soluble salts and is ready for use.

2. Four (4) parts of silicic acid, eight (8) parts of anhydrous ferric chloride, and eight (8) parts of sodium chloride are ground together and fused at a temperature between 500° C. and 1500° C. for one-half hour to three hours. The fused mass is then heated in an atmosphere of chlorine at approximately 1200° C. for one hour. The mass, after cooling, is water washed and ready for use.

In the foregoing discussions we have indicated that these halide ion exchange mediums contain metasilicates. It is, of course, probable that these materials contain, as well, some chloride orthosilicates and chloride polysilicates, or a mixture of these compounds.

In the examples of the preparation of the compounds given above, the specific ratios which we have given are not controlling except that all of the materials must be in excess over the silicic acid.

As a further illustration a material was made by fusing 5 parts of silicic acid with 25 parts of crystallized $BaCl_2$ at 900° C. for two hours. The mass was cooled and washed free of soluble chlorides.

A sample of material made in this way was tested for its capacity to remove bromine. By passing a solution containing 100 parts per million of bromine (as potassium bromide) through the material, with a time period of contact of about one-half hour, approximately 75 parts per million of bromine was removed from the solution.

Another sample of material, made in the same way, was tested for its capacity to remove the iodide ion from a solution and was found to effect a very susbtantial removal thereof.

Still another sample of the material, made in the same way, was tested for its capacity to remove the fluoride ion from water. It is not known just what concentration of fluoride ion was used. The solution was made by saturating water with calcium fluoride. In this case all of the fluoride was removed from the water.

As still a further illustration another type of material was made and tested for its capacity to remove these anions. In this case, four parts of silicic acid, eight (8) parts of anhydrous ferric chloride and eight (8) parts of sodium chloride were ground together and heated in a blast lamp at about 1000° C. for one hour. Examination of the material at this point showed it to be composed mostly of crystals of fayalite. This product was then washed with water, dried and heated in an atmosphere of chlorine at a temperature of about 1000° C. for one hour. The resulting mass was washed free from soluble chlorides, as indicated by the silver nitrate test, and tested for its capacity to remove the anions from water, and was found to function satisfactorily for this purpose.

Reference is made to our copending application 51,967, filed Nov. 27, 1935, which has similar subject-matter.

Having thus described our invention what we claim is:

1. A process for the preparation of a material having a solubility in water of less than 0.3 gram per liter for use in the removal of halide ions with the exception of the chloride ion from water comprising preparing the material in accordance with the following reaction by effecting fusion of the reactants:

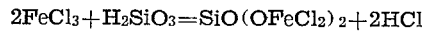

2. A process for the preparation of a material having a solubility in water of less than 0.3 gram per liter for use in the removal of halide ions with the exception of the chloride ion from water comprising preparing the material in accordance with the following reaction by effecting fusion of the reactants

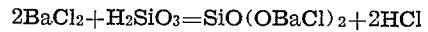

3. A process for preparing a material suitable for use in the removal of halide ions, with the exception of the chloride ion from water comprising intimately mixing and grinding together measured parts of silicic acid and hydrated barium chloride and fusing the mixture at a temperature between 500° C. and 1500° C. and thereafter removing soluble salts from the fused mass.

4. A process for preparing a material suitable for use in the removal of halide ions, with the exception of the chloride ion from water comprising intimately mixing and grinding together measured parts of silicic acid and a reagent selected from the group consisting of $FeCl_3$ and $BaCl_2$ and fusing the mixture and thereafter removing soluble salts from the fused mass.

OLIVER M. URBAIN.
WILLIAM R. STEMEN.